United States Patent [19]

Lewis et al.

[11] 4,373,190
[45] Feb. 8, 1983

[54] EFFICIENT, PRECOMPRESSION, BANDWIDTH-TOLERANT, DIGITAL PULSE EXPANDER-COMPRESSOR

[75] Inventors: Bernard L. Lewis, Oxon Hill; Frank F. Kretschmer, Laurel, both of Md.

[73] Assignee: The United States of America as represented by the Secretary of the Navy, Washington, D.C.

[21] Appl. No.: 227,323

[22] Filed: Jan. 22, 1981

[51] Int. Cl.³ .............................................. G01S 13/28
[52] U.S. Cl. .................................. 364/715; 343/5 FT; 343/17.2 PC
[58] Field of Search ...... 364/715; 343/5 FT, 17.2 PC

[56] References Cited

U.S. PATENT DOCUMENTS

| | | | |
|---|---|---|---|
| 3,680,105 | 7/1972 | Goldstone | 343/17.2 PC |
| 4,028,700 | 6/1977 | Carey et al. | 343/17.2 PC |
| 4,153,900 | 5/1979 | Novak et al. | 343/17.2 PC |
| 4,156,876 | 5/1979 | Debursser | 343/17.2 PC |
| 4,196,435 | 4/1980 | Phillips, Jr. | 343/17.2 PC |
| 4,237,461 | 12/1980 | Cantrell et al. | 343/5 FT |

OTHER PUBLICATIONS

Ohman, "Getting High Range Resolution with Pulse Compression Radar", *Electronics*, Oct. 7, 1980, pp. 53-57.

*Primary Examiner*—David H. Malzahn
*Attorney, Agent, or Firm*—Robert F. Beers; William T. Ellis; Alan P. Klein

[57] ABSTRACT

A digital pulse expander-compressor for use in pulse compression radars and having the advantage of precompression bandwidth tolerance. The pulse expander-compressor exploys a discrete Fourier transform circuit and multi-stage delay line feeding inputs $x(n)$ to the discrete Fourier transform circuit to generate outputs in accordance with the formula $$s(k) = \sum_{n=0}^{N-1} x(n) e^{-j2\pi nk/N}$$

where n is the sequence number of the clock pulse; N is the number of delay stages plus one; and k is the number of the output subpulse from the transform circuit. An arrangement of delay stages differentially delays the output subpulses from the discrete Fourier transform circuit, and a coherent summer adds the real and imaginary parts of the signals from the delay lines. The delay stages delay the subpulse $s(k)$, $0 \leq k \leq N/2 - 1$, by $$N\left(k + \frac{N}{2} - 1\right)$$

clock pulse intervals, while delaying the subpulse $s(k)$, $N/2 + 1 \leq k \leq N - 1$, by $$N\left(k - \frac{N}{2} - 1\right)$$

clock pulse intervals. The subpulse $s(k)$, $k = N/2$, is not used. The pulse expander-compressor generates and compresses a polyphase code pulse with a pulse compression ratio of $M^2$ where M is an odd integer less than N. An odd integer is desired so that the code can be made to have conjugate symmetry about the zero modulation frequency code subsequence.

8 Claims, 5 Drawing Figures

EFFICIENT, PRECOMPRESSION, BANDWIDTH-TOLERANT, DIGITAL PULSE EXPANDER-COMPRESSOR

BACKGROUND OF THE INVENTION

This invention relates generally to polyphase code systems and more particularly to digital systems for coding and decoding sequences of polyphase encoded signals.

In a conventional radar, the transmitted waveform is a train of pulses as shown in FIG. 1a of the accompanying drawing. The mean power is determined by the peak power and the duty ratio, that is to say the ratio of the width of the pulses to the overall repetition period T. T is fixed by the maximum unambiguous range, and $\tau$ by the resolution required. Thus, to improve the detectability of the radar only the peak power can be increased and this is limited by the components used. There is therefore a conflict of interests if both improved detectability and resolution are required.

It is now recognized that the resolution is not governed by the pulse length but by the overall transmitted bandwidth. Thus, by modulating the carrier within the transmitted pulse length the bandwidth is increased and the resolution improved with no reduction in mean transmitted power.

One known form of modulation to effect pulse compression is phase modulation in which, within the width of the transmitted pulse, the phase is changed at specified intervals or subpulses. While these phase changes can follow a random sequence, by using certain well-defined sequences known as "Frank codes" it is possible to reduce the level of the sidelobes after processing of the received pulse. An example of a known method to transmit and detect Frank-coded radar pulses is described in U.S. Pat. No. 4,237,461.

In FIG. 1(b) of the drawing, there is shown the pattern of phase changes within a pulse 11 subdivided into four subsequences of subpulses 11a–d, each subsequence having four subpulses, $\tau$ seconds long, so forming a Frank code with a pulse compression ratio of $(4)^2 = 16$. The subpulses are at a constant carrier frequency and related to a CW reference signal by a phase angle of $(n)(90°)$, where $0 \leq n \leq 3$. The phase, in radians, encoded on each of the subpulses 11a–d of the pulse 11 may be determined from the matrix of Table 1, as read from left to right progressing from the top to the bottom row.

TABLE 1

| 0 | 0 | 0 | 0 |
|---|---|---|---|
| 0 | $\pi/2$ | $\pi$ | $3\pi/2$ |
| 0 | $\pi$ | 0 | $\pi$ |
| 0 | $3\pi/2$ | $\pi$ | $\pi/2$ |

A clockwise phase rotation (phase advance) has arbitrarily been assigned a positive value while a counter-clockwise rotation (phase delay) is designed a negative value. A phase advance of X radians is equivalent to a phase delay of $2\pi - X$ radians. The phase in complex numbers is shown in Table 2.

TABLE 2

| 1 | 1 | 1 | 1 |
|---|---|---|---|
| 1 | $-j$ | $-1$ | $+j$ |
| 1 | $-1$ | 1 | $-1$ |
| 1 | $+j$ | $-1$ | $-j$ |

The phases encoded on the four subpulses of the first subsequence 11a are indicated in the top row of the matrix of Table 1 or Table 2; the phases encoded on the four subpulses of the second subsequence 11b are indicated in the second row of the matrix; the phases for the four subpulses of the third subsequence 11c in the third row; and the phases for the four subpulses of the fourth subsequence 11d in the fourth row. Examining the phases encoded on the four subpulses of each subsequence 11a–d, it will be seen that the phase increases linearly from subpulse to subpulse at a rate of 0 radians per subpulse in the first subsequence 11a; at a rate of $\pi/2$ radians per subpulse in the second subsequence 11b; at a rate of $\pi$ radians per subpulse in the third subsequence 11c; and at a rate of $3\pi/2$ (or $-\pi/2$) radians per subpulse in the fourth subsequence 11d. Examining the slope of the phase increase of each subsequence, it will be seen that the slope increase linearly from subsequence to subsequence at a rate of $\pi/2$ radians per subsequence. Since frequency is the rate of change of phase, linearly increasing phase is a constant frequency. Thus, each subsequence 11a–d represents a different frequency measured with respect to the carrier frequency, viz. 0, $(\pi/2)/\tau$, $\pi/\tau$, and $(3\pi/2)/\tau$ (or $-(\pi/2)/\tau$) respectively for each of the subsequences in order. Since the frequency (slope of phase) also changes linearly by $(\pi/2)/\tau$ from subsequence to subsequence, the Frank code is seen to be a step-wise approximation to a swept frequency.

The auto-correlation function of pulse 11 as might be obtained in the matched filter of a pulse-compression radar receiver is shown in FIG. 1c. This graph shows the level of correlation of a pulse as in FIG. 1b with a similar pulse when plotted against the relative time of the pulses being completed. It will be seen that except at coincidence in time, the correlation function takes on values between 0 and 1 and that when the two signals are coincident the correlation function has a value of 16. This means that though the transmitted pulse has an overall duration of $16\tau$, the resolution of the radar is $1\tau$ and there is a ratio of 16 to 1 between the level of the sidelobes and the correlation peak.

It is known that the receivers of conventional radars are band-limited. That is to say, the gain of the receiver is inversely-proportional to the frequency deviation from the carrier frequency. Thus, a pulse, such as shown in FIG. 1b, having four subpulse subsequences 11a–d of different frequencies measured with respect to the carrier frequency is attenuated unevenly across the pulse. The end subsequences for which the frequencies are closest to the carrier frequency are attenuated the least, while the center subsequences, for which the frequencies are furthest away from the carrier frequency, are attenuated the most. Specifically, the first, second and fourth subsequences 11a, 11b and 11d having respective frequencies of 0, (carrier frequency) $(\pi/2)/\tau$ and $-(\pi/2)/\tau$ are attenuated the least, while the third subsequence 11c having a frequency of $\pi/\tau$ is attenuated the most. This inverse weighting disadvantageously suppresses the peak response of the radar receiver. It also reduces the ratio between the correlation peak of the auto-correlation function and the level of the sidelobes. The latter is undesirable because it increases the possibility that weak target echos will be hidden by the sidelobes from an adjacent stronger target echo.

SUMMARY OF THE INVENTION

It is therefore an object of this invention to transmit long coded pulses and to digitally compress the long coded pulses to short pulses of optimum signal-to-noise ratio.

Another object is to use a code that is tolerant of precompression bandwidth limitations.

A further object is to provide optimum compression with a minimum amount of circuitry.

Briefly described, the subject invention involves a digital pulse expander-compressor which generates and compresses a modified Frank polyphase code to obtain precompression bandwidth limitation tolerance. The pulse expander-compressor includes a transform circuit for successively generating N (where N is an integer) replicas $x(n)$ of an applied subpulse, where $n=0, 1,2,-, N-1$, in a time which is N times the length of the subpulse, and for weighting the replicas $x(n)$ to provide N weighted subpulses $s(k)$, where $k=0, 1,2,-, N-1$, at respective output terminals, whenever one of the N replicas is generated. The weighted subpulses $s(k)$ are related to the unweighted subpulses $x(n)$ in accordance with the formula $$s(k) = \sum_{n=0}^{N-1} x(n)e^{-j2\pi nk/N}$$

Also included in the pulse expander-compressor is a delay-summation circuit for selectively delaying each of the weighted subpulses $s(k)$ corresponding to any replica of the applied subpulse, and for separately summing the real and imaginary parts of the delayed subpulses. The delay-summation means delays each of the weighted subpulses $s(k)$ as follows: If $0 \leq k \leq N/2-1$, the weighted subpulse $s(k)$ is delayed by a time which is $$N\left(k + \frac{N}{2} - 1\right)$$

times as long as the applied subpulse. If $N/2+1 \leq k \leq N-1$, the weighted subpulse $s(k)$ is delayed by a time which is $$N\left(k - \frac{N}{2} - 1\right)$$

times as long as the applies subpulse.

The pulse expander-compressor generates and compresses a polyphase coded pulse with a pulse compression ratio of $M^2$ where M is an odd integer less than N. The polyphase code has conjugate symmetry about the zero frequency subsequence. The use of a code which is symmetrical about the zero frequency subsequence avoids the undersirable inverse weighting by band-limited receivers. In addition, the use of a fast Fourier transform circuit in one embodiment minimizes the amount of hardware required to implement the invention.

Additional advantages and features will become apparent as the subject invention becomes better understood by reference to the following detailed description when considered in conjunction with the accompanying drawings wherein:

DESCRIPTION OF THE PREFERRED EMBODIMENT

Figure 2:
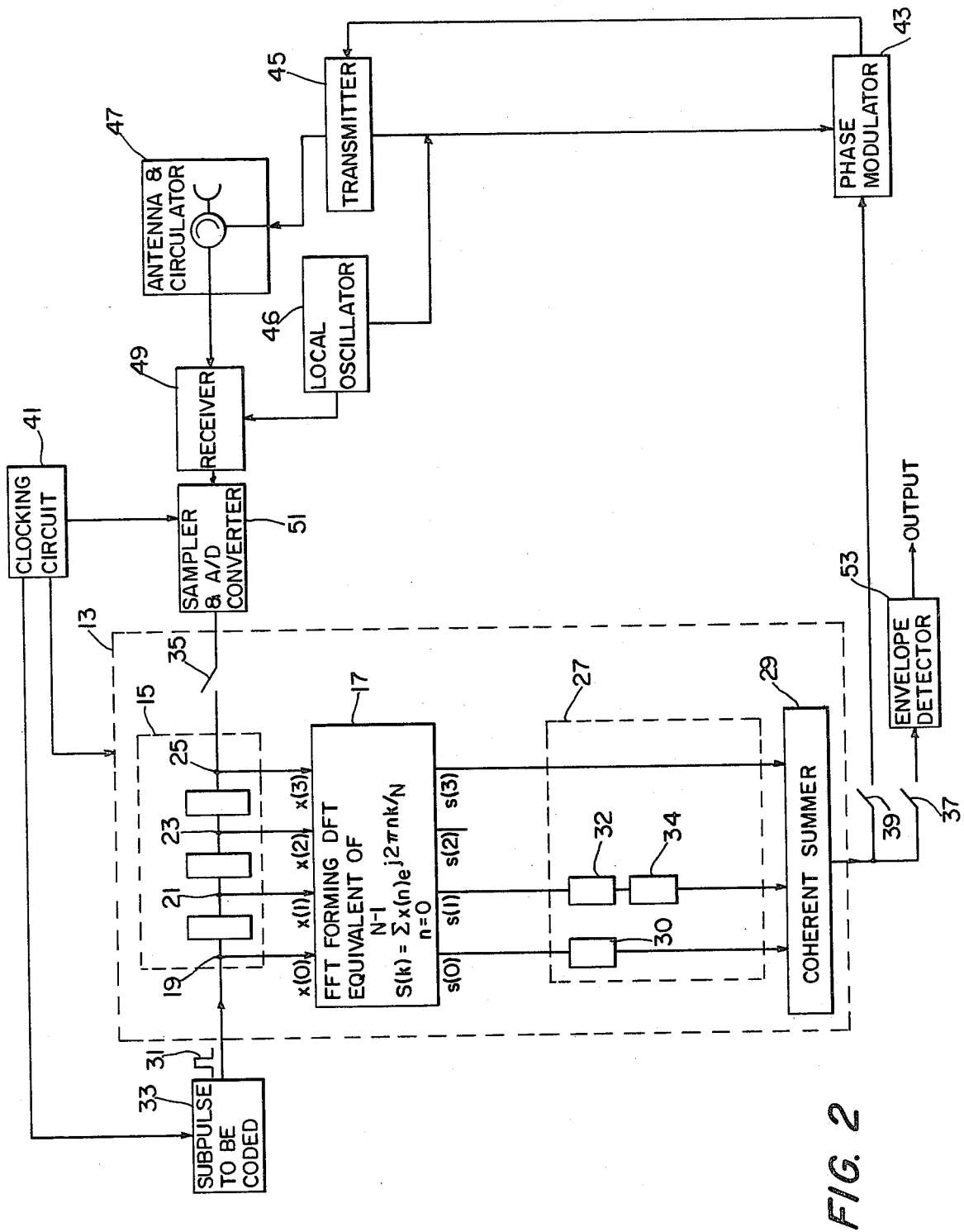
FIG. 2 is a block diagram of an embodiment of the pulse expander-comressor of the invention incorporated in a pulse-comression radar.

An embodiment of the digital pulse expander-compressor 13 which exhibits the advantage of precompression bandwidth tolerance is shown in FIG. 2 enclosed in the dashed lines.

The pulse expander-compressor 13 includes transform means for successively generating N (where N is an integer) replicas $x(n)$ of an applied subpulse, where $n=0, 1,2,-, N-1$, in a time which is N times the length of the subpulse, and for weighting the replicas $x(n)$ to provide N weighted subpulses $s(k)$, where $k=0, 1, 2,-, N-1$, at respective output terminals of the transform means whenever one of the N replicas is generated. The weighted subpulse $s(k)$ is related to the unweighted subpulses $x(n)$ in accordance with the formula $$s(k) = \sum_{n=0}^{N-1} x(n)e^{-j2\pi nk/N} \quad (1)$$

While the transform means may take a variety of forms, conveniently it may take the form illustrated in FIG. 2 of a delay means 15, and a conventional fast Fourier transform circuit 17 which is connected to the delay means.

Delay means 15 has N distributed output terminals 19, 21, 23 and 25 (including the input terminal) for producing a uniform delay the length of the applied subpulse between adjacent ones of successive output terminals. ($N=4$ in the illustrated embodiment but it is to be understood that N may be any integer). Delay means 15 may comprise, for example, a delay line having a plurality of equal delay stages with output terminals at its input and after every stage.

The fast Fourier transform circuit 17 is coupled to the N distributed output terminals 19, 21, 23 and 25 of the delay means 15 for forming discrete Fourier transform signals $s(k)$ equivalent to formula (1).

Also included in the pulse expander-compressor 13 is delay-summation means for selectively delaying each of the weighted subpulses $s(k)$ corresponding to any replica of the applied subpulse, and for separately summing the real and imaginary parts of the delayed subpulses. The delay-summation means delays each of the weighted subpulses $s(k)$ as follows: If $0 \leq k \leq N/2-1$, The weighted subpulse $s(k)$ is delayed by a time which is $$N\left(k + \frac{N}{2} - 1\right)$$

times as long as the applied subpulse. If $N/2+1 \leq k \leq N-1$, the weighted subpulse $s(k)$ is delayed by a time which is of a matched filter. The output of the coherent summer 29 (the auto-correlation function) has a peak amplitude in the twelfth clock pulse interval, which can be seen in the output of the envelope detector 53.

Figure 1A:
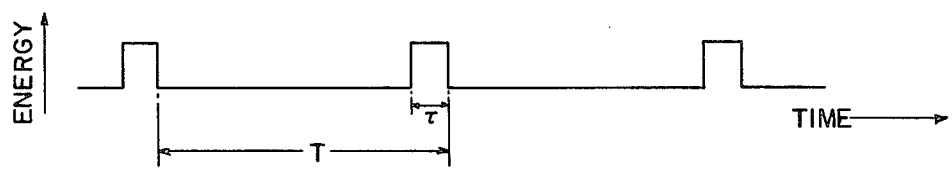
FIGS. 1a–1c depict the pattern of phase changes within a transmitted pulse and the auto-correlation function of the pulse.
Figure 1B:
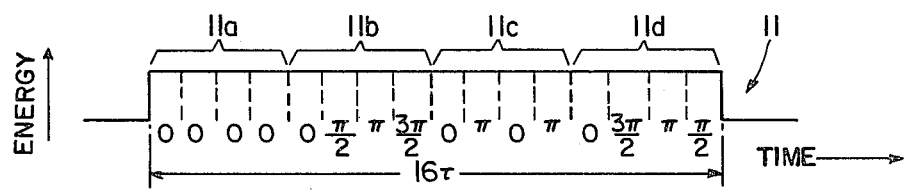
Figure 1C:
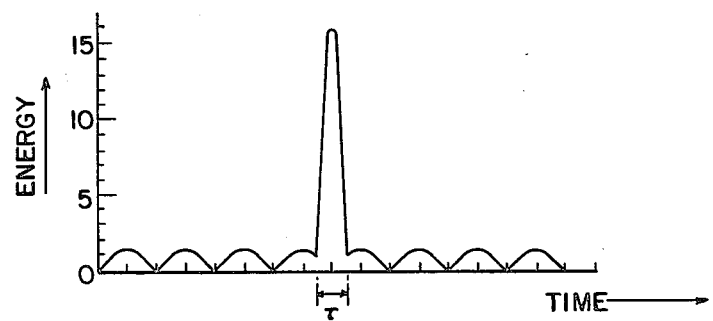
Figure 3:
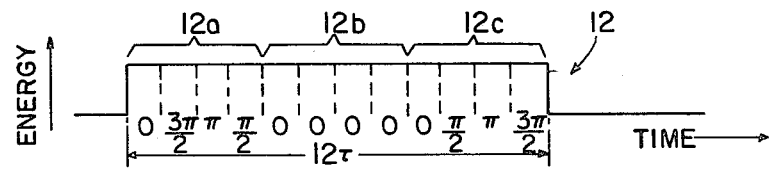
FIG. 3 depicts the pattern of phase changes within a pulse transmitted by the radar of FIG. 2.

Referring again in FIG. 3 which shows the pattern of phase changes within the modulated carrier pulse 12, it is seen that the end subsequences 12a and 12c are identical with the Frank code subsequences 11d and 11b of FIG. 1b, and that the center subsequence 12b is identical with the Frank code subsequence 11a of FIG. 1b. Thus, the frequencies of the end subsequences 12a and 12c in the transmitted pulse are furthest from the carrier frequency, while the frequency of the center subsequence 12b is at the carrier frequency. Furthermore, the frequencies of the end subsequences 12a and 12c are symmetrical about the frequency of the center subsequence 12b (the carrier frequency). Specifically, the end subsequences 12a and 12c of the transmitted pulse have respective frequencies of $\pi/2\tau$ and $-\pi/2\tau$, while the center subsequence 12b has a frequency of 0. The rearrangement of the order of transmission of the Frank code subsequences by pulse expander-compressor 13 avoids the the inverse-weighting effect heretofore produced in the band-limited radar receiver. Thus it will be seen that the present invention solves the problems of peak response suppression and auto-correlation peak-to-sidelobe ratio decrease.

While the invention has been described with reference to a particular transmitting and receiving system, in this case, a radar system, it is noted that the same techniques are available for a variety of other signal processing systems such as sonar, etc.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An efficient, pre-compression, bandwidth-tolerant, digital pulse expander-compressor comprising:
   transform means having N output terminals and responsive to an applied subpulse for successively generating N replicas x(n) of the subpulse, where n=0, 1, 2,-, N−1 and N is an integer, in a time which is N times the length of the subpulse, and for weighting the replicas x(n) in accordance with the formula $$s(k) = \sum_{n=0}^{N-1} x(n)e^{-j2\pi nk/N}$$

where k=0, 1, 2,-, N−1, to provide N weighted subpulses s(k), each at a respective one of the N output terminals, whenever one of the N replicas x(n) is generated; and
   delay-summation means connected to the transform means for delaying each of the N weighted supulses s(k) corresponding to any replica of the applied subpulse by a time which is $$N\left(k + \frac{N}{2} - 1\right)$$

the length of the applied subpulse for $0 \leq k \leq N/2 - 1$, and by a time which is $$N\left(k - \frac{N}{2} - 1\right)$$

the length of the applied subpulse for $N/2+1 \leq k \leq N-1$, and for separately summing the real and imaginary parts of the delayed subpulses.

2. The pulse expander-compressor recited in claim 1 wherein the transform means includes:
   delay means having N distributed output terminals including the input terminal thereof for producing a uniform delay as long as the applied subpulse between adjacent ones of successive output terminals.

3. The pulse expander-compressor recited in claim 2 wherein the transform means includes:
   a fast Fourier transform circuit connected to the N distributed output terminals of the delay means for forming discrete Fourier transform signals.

4. The pulse expander-compressor recited in claim 1 wherein the delay-summation means includes:
   a coherent summer.

5. The pulse expander-compressor recited in claim 4 wherein the delay-summation means includes:
   a plurality of delay means, each delay means for producing a delay between the input and output thereof N times the length of the applied subpulse, $$\left(k + \frac{N}{2} - 1\right)$$

such delay means being serially connected between the coherent summer and the output terminal of the transform means for the weighted subpulse s(k) for $0 \leq k \leq N/2 - 1$, and $$\left(k - \frac{N}{2} - 1\right)$$

such delay means being serially connected between the coherent summer and the output terminal of the transform means for the weighted subpulse s(k) for $N/2+1 \leq k \leq N-1$.

6. An efficient pre-compression, bandwidth-tolerant method of pulse expansion and compression comprising the steps of:
   generating N replicas x(n) of an applied subpulse, where n=0, 1, 2,-, N−1 and N is an integer, in a time which is N times the length of the subpulse;
   weighting the replicas in accordance with the formula $$s(k) = \sum_{n=0}^{N-1} x(n)e^{-j2\pi nk/N}$$

where k=0, 1, 2,-, N−1 to provide N weighted subpulses s(k) whenever one of the N replicas x(n) is generated;
   and $$N\left(k - \frac{N}{2} - 1\right)$$

times as long as the applied subpulse.

While the delay-summation means may take a variety of forms, conveniently it may take the form illustrated in FIG. 2 of a plurality 27 of delay means, and a coherent summer 29 which is connected to the plurality of delay means.

Each of the delay means 30, 32 and 34 produces a delay between its input and its output which is N times the length of the applied subpulse. Each of the delay means 30, 32 and 34 may comprise, for example, an N stage shift register wherein each stage produces a delay equal to the length of the applied subpulse. As illustrated, $$\left(k + \frac{N}{2} - 1\right)$$

such delay means are serially connected between the coherent summer 29 and the output terminal of the transform means for the weighted subpulse s(k), $0 \leq k \leq N/2-1$. Also, $$\left(k - \frac{N}{2} - 1\right)$$

such delay means are serially connected between the coherent summer 29 and the output terminal of the transform means for the weighted subpulse s(k), $N/2+1 \leq k \leq N-1$. The output terminal of the transform means for the weighted subpulse $$s\left(\frac{N}{2}\right)$$

is left open.

FIG. 2 illustrates the digital pulse expander-compressor as it might be used as part of a pulse compression radar. In operation, a pulse generator 33 generates the initial applied subpulse 31 of length $\tau$. Switches 35 and 37 are opened while switch 39 closed. The subpulse 31 is clocked into the delay means 15 which provides three equal intervals of delay, each equal to $\tau$. Outputs are taken from the input terminal 19 of the first delay stage, the output terminal 21 of the first delay stage, the output terminal 23 of the second delay stage, and the output terminal 25 of third delay stage, viz., x(0), x(1), x(2), x(3), respectively. Time zero (0) corresponds to the interval of the first clock pulse when the subpulse 31 to be coded is clocked out of the pulse generator 33 and applied to the input terminal 19 of the first delay stage; time (1) corresponds to the interval of the second clock pulse which permits the subpulse 31 at the input terminal 19 of the first delay stage to pass through the first delay stage and to be replicated at its output terminal 21; and so on. The clocking circuit is shown in simplified form in block 41. The clock pulse intervals are of length $\tau$. The delay means 15 essentially provides for time expansion of the subpulse 31. It provides four input signals to the fast Fourier transform circuit 17, viz. 1000, 0100, 0010, and 0001 in a time $4\tau$ which is four times as long as that of the applied subpulse 31. (presence of a subpulse replica is denoted by a 1, absence of a subpulse replica by a 0). A tabulation of the (x) outputs is provided in Table 3.

TABLE 3

|  | x(0) | x(1) | x(2) | x(3) |
|---|---|---|---|---|
| 1st clock pulse: | 1 | 0 | 0 | 0 |
| 2nd clock pulse: | 0 | 1 | 0 | 0 |
| 3rd clock pulse: | 0 | 0 | 1 | 0 |
| 4th clock pulse: | 0 | 0 | 0 | 1 |
| 5th etc. clock pulse: | 0 | 0 | 0 | 0 |

A tabulation of the corresponding (s) outputs from the fast Fourier circuit 17 which forms discrete Fourier transform signals s(k) equivalent to formula (1) is provided in Table 4.

TABLE 4

|  | s(0) | s(1) | s(2) | s(3) |
|---|---|---|---|---|
| 1st clock pulse: | 1 | 1 | 1 | 1 |
| 2nd clock pulse: | 1 | $-j$ | $-1$ | $+j$ |
| 3rd clock pulse: | 1 | $-1$ | 1 | $-1$ |
| 4th clock pulse: | 1 | $+j$ | $-1$ | $-j$ |

The outputs from the fast Fourier transform circuit 17, except for s(2), are individually fed to the plurality 27 of delay means, each of which supplies a delay equal to four clock pulse intervals. Thus, s(0) has a delay of $4\tau$, s(1) a delay of $8\tau$, and s(3) no delay. For the first four clock pulses, the only inputs to the coherent summer 29 are the series of complex subpulses on the s(3) line; for the next four clock pulses, the series of complex subpulses on the s(0) line; and for the next four, the series of complex subpulses on the s(1) line. The summer 29 separately adds the real parts and the imaginary parts of the subpulses so that a single subpulse with a real and an imaginary part is formed for each clock pulse interval. These subpulses are fed to the phase modulator 43 where they modulate the phase of the carrier pulse of the transmitter 45. The sequence of subpulses fed to the phase modulator 43 is (1) (+j) (−1) (−j) (1) (1) (1) (1) (1) (−j) (−1) (+j). Note that the output pulse from the phase modulator 43 extends over 12 clock pulse intervals. The pattern of phase changes within the modulated carrier pulse 12 is shown in FIG. 3. The phase-modulated carrier pulse is propagated into space by the antenna 47 and, if it strikes a target, an echo signal is returned. If the receive mode, switches 35 and 37 are closed while switch 39 is opened. The echo signal is processed through the receiver 49 and sent through the sampler-and-A/D converter circuit 51 which converts the phase-modulated carrier pulse into a sequence of complex subpulses again. These subpulses are fed back through the delay means 15 but the delays are now in time-inverted order, that is, x(3) now has no delay, x(2) is delayed one clock pulse interval, x(1) two clock pulse intervals and x(0) three clock pulse intervals. The time-inverted, delayed subpulses are again fed through the fast Fourier transform circuit 17 to the plurality 27 of delay means which is arranged to provide the delays for the weighted subpulses s(0), s(1), and s(3) as before. Thus, no delay is inserted in s(3), $4\tau$ of delay in s(0), and $8\tau$ delay in s(1). The output of the plurality 27 of delay means is fed through the coherent summer 29 and the envelope detector 53 to provide a cross-correlated facsimile of the original applied subpulse 31, in the manner separately summing the real and imaginary parts of the weighted subpulses s(k), where $0 \leq k \leq N/2-1$ and $N/2+1 \leq k \leq N-1$, corresponding to any replica of the applied subpulse, after a delay time which is $$N\left(k + \frac{N}{2} - 1\right)$$

the length of the applied subpulse for $0 \leq k \leq N/2-1$ and after a delay time which is $$N\left(k - \frac{N}{2} - 1\right)$$

length of the applied supulse for $N/2+1 \leq k \leq N-1$.

7. The pulse expansion and compression method recited in claim 6 wherein the generating step includes: successively delaying the subpulse by uniform delays as long as the applied subpulse.

8. The pulse expansion and compression method recited in claim 6 wherein the weighting step includes: forming discrete Fourier transform signals with a fast Fourier transform circuit.

* * * * *